(12) United States Patent
Bömmels et al.

(10) Patent No.: US 9,580,859 B2
(45) Date of Patent: Feb. 28, 2017

(54) LINT RETENTION FOR A LAUNDRY DRYING APPLIANCE

(75) Inventors: Ralf Bömmels, Falkensee (DE); Bernd Gemünden, Deisenhofen (DE); Jürgen Heβ, Berlin (DE); Vladimir Proseanic, West Bloomfield, MI (US); Svetlana Visnepolschi, West Bloomfield, MI (US)

(73) Assignee: BSH Hausgeräte GmbH, Munich (DE)

( * ) Notice: Subject to any disclaimer, the term of this patent is extended or adjusted under 35 U.S.C. 154(b) by 905 days.

(21) Appl. No.: 13/546,070

(22) Filed: Jul. 11, 2012

(65) Prior Publication Data
US 2014/0013608 A1 Jan. 16, 2014

(51) Int. Cl.
| | | |
|---|---|---|
| *D06F 58/22* | (2006.01) |
| *B01D 50/00* | (2006.01) |
| *B01D 47/00* | (2006.01) |
| *F26B 25/00* | (2006.01) |
| *B01D 45/00* | (2006.01) |

(52) U.S. Cl.
CPC .............. *D06F 58/22* (2013.01); *B01D 47/00* (2013.01); *B01D 50/004* (2013.01); *B01D 50/006* (2013.01); *F26B 25/007* (2013.01); *B01D 45/00* (2013.01)

(58) Field of Classification Search
CPC ... B01D 50/004; B01D 50/006; B01D 50/008; D06F 58/22; F26B 25/007
USPC ......... 96/313, 314, 319, 320, 321, 355, 361, 96/362, 363, 364
See application file for complete search history.

(56) References Cited

U.S. PATENT DOCUMENTS

| | | | | | |
|---|---|---|---|---|---|
| 2,718,711 | A | * | 9/1955 | Clark | .................................. 34/75 |
| 2,726,853 | A | * | 12/1955 | Schleyer et al. | ................... 261/5 |
| 2,825,148 | A | * | 3/1958 | Olson | .................................. 34/75 |
| 4,279,627 | A | * | 7/1981 | Paul et al. | ....................... 96/316 |
| 4,286,973 | A | * | 9/1981 | Hamlin | ................ B01D 50/004 |
| | | | | | 261/116 |
| 4,491,608 | A | * | 1/1985 | Thygesen | ..................... 427/186 |
| 4,498,786 | A | | 2/1985 | Ruscheweyh | |
| 5,039,315 | A | * | 8/1991 | Liao | ........................ B01D 47/10 |
| | | | | | 261/116 |
| 5,466,270 | A | * | 11/1995 | Abdelmalek | .................... 96/319 |
| 5,667,374 | A | * | 9/1997 | Nutcher | .................. F23D 14/02 |
| | | | | | 431/328 |
| 6,270,558 | B1 | | 8/2001 | Theiler | |

(Continued)

FOREIGN PATENT DOCUMENTS

| | | |
|---|---|---|
| CN | 1239902 A | 12/1999 |
| CN | 102015111 A | 4/2011 |

(Continued)

OTHER PUBLICATIONS

International Search Report PCT/IB2013/055410.

*Primary Examiner* — David J Laux
(74) *Attorney, Agent, or Firm* — Nixon & Vanderhye P.C.

(57) ABSTRACT

A lint retention apparatus for a laundry drying appliance has a lint separator, upstream of which a lint wetter is connected. A laundry drying appliance has a laundry drum and a process air condenser, which are connected by way of a process air channel conducting process air. It also has a lint separator disposed in the process air channel for flow purposes downstream of the laundry drum and upstream of the process air condenser, wherein a lint wetter is disposed for flow purposes downstream of the laundry drum and upstream of the lint separator.

21 Claims, 3 Drawing Sheets

(56) References Cited

U.S. PATENT DOCUMENTS

| | | | | |
|---|---|---|---|---|
| 6,565,636 | B1* | 5/2003 | Thompson | B01D 47/06 96/241 |
| 8,202,352 | B2* | 6/2012 | Hu et al. | 95/220 |
| 2003/0167740 | A1* | 9/2003 | Murphy | B01D 45/16 55/337 |
| 2010/0154240 | A1 | 6/2010 | Grunert | |
| 2010/0155326 | A1 | 6/2010 | Grunert | |
| 2012/0017456 | A1* | 1/2012 | Grunert | 34/82 |
| 2012/0096739 | A1* | 4/2012 | Clark | D06F 58/02 34/553 |
| 2013/0340621 | A1* | 12/2013 | Tanis | B01D 50/006 96/142 |

FOREIGN PATENT DOCUMENTS

| | | |
|---|---|---|
| DE | 3639046 A1 | 5/1988 |
| DE | 19739378 A1 | 3/1999 |
| EP | 0535348 A1 | 4/1993 |
| EP | 1380683 A2 | 1/2004 |
| EP | 2559805 A1 | 2/2013 |

* cited by examiner

LINT RETENTION FOR A LAUNDRY DRYING APPLIANCE

BACKGROUND OF THE INVENTION

The invention relates to a lint retention apparatus for a laundry drying appliance (in particular a tumble dryer or washer/dryer), the lint retention apparatus having a lint separator. The invention also relates to a laundry drying appliance, having a laundry drum and a process air condenser, which are connected by way of a process air-conducting process air channel, and having a lint separator disposed in the process air channel for flow purposes downstream of the laundry drum and upstream of the condenser.

Lint is typically emitted by the laundry to be dried into the process air flowing along during a drying process and includes, for example, fiber particles produced during washing or drying. If such particles are not eliminated from the process air, they can settle on a process air condenser, where hot and moist process air exiting from the laundry drum is typically cooled and as a result stripped from moisture contained therein by condensation. The settling of the lint reduces the efficiency of the process air condenser. Cleaning off the lint that has settled on the process air condenser is a complex operation and must normally be performed by a user between drying processes, or even by service personnel only.

To prevent lint settling on the process air condenser, it is known to dispose a lint separator in the form of a mesh filter in a process air channel between the laundry drum and the process air condenser for through flow by process air. Generally small dimensions of lint particles of only around one micrometer mean that the particles can pass through most mesh filters, which generally have larger mesh sizes. Mesh filters with smaller mesh sizes disadvantageously demonstrate high flow resistances for the process air passing through. Also the mesh filters have to be cleaned from time to time to remove lint formed by larger particles, etc., which has to be done manually by a user and is time consuming.

The use of a lint separator in the form of a cyclone separator is known from EP 1 380 683 A2 or DE 197 39 378 A1. This has the disadvantage that the separation effect is relatively poor, as the effective density of the lint present in the process air flow is similar to the density of air.

EP 0 535 348 A1 discloses a lint separator in the form of a process air washer, in which the process air is sprayed with condensate to form a condensate curtain, and lint which adheres to the condensate curtain is eliminated from the process air. However such a lint separator is relatively ineffective and also complex in structure.

BRIEF SUMMARY OF THE INVENTION

An object of the present invention is to overcome the disadvantages of the prior art at least to some extent and in particular to provide a better way of separating lint from the process air in a laundry drying appliance.

An object is achieved by a lint retention apparatus for a laundry drying appliance, having a lint separator (for separating or eliminating lint from the process air), where a lint wetter (for wetting the lint) is connected upstream of the lint separator. Wetting causes conglomerations of lint and water to form in the flow upstream of the lint separator. These conglomerations can therefore be removed more simply and effectively from the process air than pure lint, since their spatial dimensions are greater than those of pure lint. Also the water in the conglomerations improves adhesion to the lint separator, thereby simplifying retention. Generally therefore even small items of lint can be retained effectively and relatively simply, even using conventional lint separators.

In an exemplary embodiment the lint wetter has a vapor generator and/or a vaporizer. These allow vapor and/or small water particles ("mist particles") to be introduced at high density into a flow of process air containing lint, allowing a high degree of wetting of the lint and therefore also providing effective lint retention or lint separation.

The vapor generator can be a hot vapor generator or a wet vapor generator.

The vaporizer can be a spray facility, an atomizer, an atomizer actuated by a piezo actuator, or a centrifuge, to generate an aerosol mist.

During wetting, the vapor and/or mist particles are absorbed on the surfaces of the lint particles. Touching conglomerations or lint can join up with one another due to the surface tension of the water. Adhesion of the conglomerations is observed for the same reason at almost any point which the conglomerations come into contact with or where non-wetted lint particles come into contact with a wet point.

In another exemplary embodiment the lint separator has a filter bag to retain wet lint. This has the advantage that it is cheap, has a large capacity and is simple to clean. Also the fairly long dimensions allow a sufficient time period for effective conglomeration formation, even when vapor and/or mist particles are introduced immediately upstream of an opening in the filter bag. The conglomerations allow the pore size to be relatively large, so that a process air flow is not significantly impeded.

In a further exemplary embodiment the lint separator has a flat sieve for retaining wet lint. The flat sieve is simple to clean. The sieve can be a metal sieve, a fabric or textile in particular.

In yet a further exemplary embodiment the lint wetter is designed to generate at least one eddying flow of vapor and/or mist particles. This improves conglomeration formation. The lint wetter can be configured for example with an open jet nozzle or Karman eddy flow generator.

In still a further exemplary embodiment the lint separator also has a cyclone separator for separating wet lint. Compared with individual items of lint, the conglomerations are so heavy that they can be separated relatively simply from the process air. Also water adhesion means that the conglomerations adhere readily to walls of the cyclone separator that they come into contact with, further assisting with effective separation or retention. Use of a cyclone separator has the advantage that it does not have to be cleaned, as it can automatically discharge the lint as a lint/water mixture (which results for example when the conglomerations run down the walls of the cyclone separator), meaning that there is no need for cleaning, e.g. the removing of lint separated and then collected by the cyclone separator, or this can be shortened considerably.

In another exemplary embodiment a wall of the cyclone separator that can come into contact with lint is also moistened specifically. This improves the adhesion of conglomerations and free lint (if still present) and the running down of the lint for its elimination from the cyclone separator.

In an embodiment which is exemplary for easier running down, a wall of the cyclone separator that can come into contact with wet lint is provided with an easy-slide coating. The easy-slide coating can include in particular PTFE or nanostructures or nanoparticles, for example to produce a lotus effect.

In another exemplary embodiment the cyclone separator also has a process air inlet and a pressurized air inlet aligned at an angle thereto, so that pressurized air entering through the pressurized air inlet is made to move in a rotating manner by process air containing lint, which flows in through the process air inlet. This allows a particularly marked rotational movement and therefore the separation by a cyclone effect.

In yet another exemplary embodiment the vapor and/or mist particles is or are introduced or can be fed through the pressurized air inlet into the lint separator, allowing particularly thorough mixing with the process air containing lint. An outlet of the lint wetter can therefore open or extend in particular into a pressurized air channel leading to the pressurized air inlet. Alternatively the vapor and/or mist particles can be introduced through the process air inlet into the lint separator.

Alternatively the process air itself can generate a rotational movement, e.g. by means of a correspondingly curved process air conduction in the cyclone separator.

An object is also achieved by a laundry drying appliance, having a laundry drum and a process air condenser, which are connected by way of a process air-conducting process air channel, and having a lint separator disposed in the process air channel for flow purposes downstream of the laundry drum and upstream of the condenser, where a lint wetter is disposed for flow purposes downstream of the laundry drum and upstream of the lint separator.

The inventive laundry drying appliance has the same advantages as the lint retention apparatus and can be embodied in exemplary embodiments in a similar manner.

The laundry drying appliance can be a tumble dryer or washer/dryer in particular.

The process air condenser can be, for example, a cooling water condenser or an evaporator of a heat pump.

BRIEF DESCRIPTION OF THE DRAWINGS

The figures of the accompanying drawing show schematic illustrations of exemplary embodiments of the invention. These exemplary embodiments are described in more detail below. For the sake of clarity, identical elements or those of identical function can be provided with identical reference numerals. In side views of sectional diagrams.

DETAILED DESCRIPTION OF EXEMPLARY EMBODIMENTS OF THE PRESENT INVENTION

Figure 1:
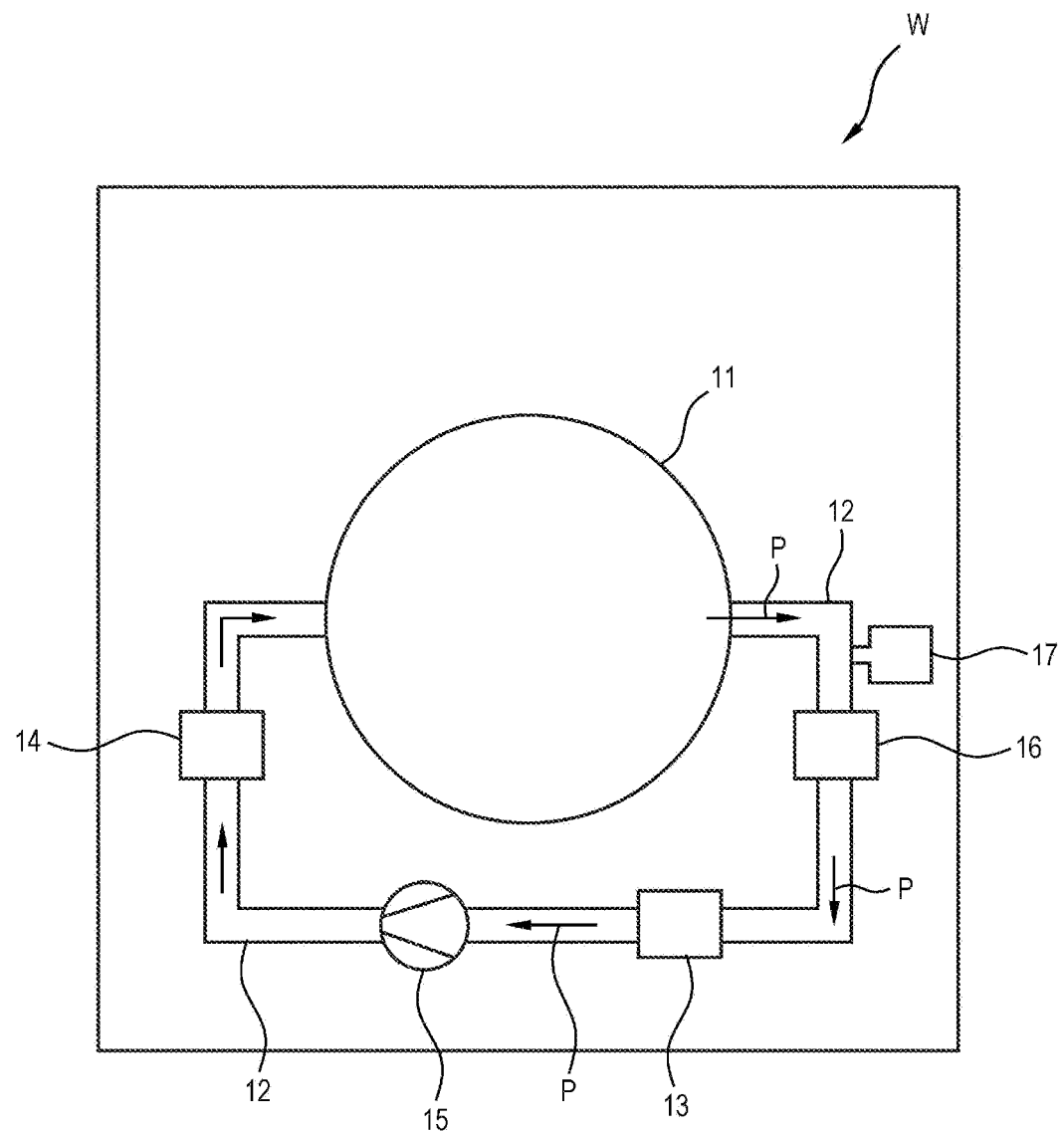
FIG. 1 shows an outline of a tumble dryer.

FIG. 1 shows a side view of a sectional diagram of an outline of a laundry drying appliance in the form of a circulating air tumble dryer W. The tumble dryer W has a laundry drum 11 to hold laundry to be dried (not shown). Connected to the laundry drum 11 is a circumferential process air channel 12. Hot moist process air P from the laundry drum 11 can enter the process air channel 12 and flows to a process air condenser 13, which cools the process air P and allows it to condense, so that it is present downstream of the process air condenser 13 as cool dry process air P. This cool dry process air P flows on to a heater 14, wherein it is heated, in order then to be reintroduced into the laundry drum 11 as hot dry process air P. The hot dry process air P is particularly suitable for extracting moisture from the laundry. The flow of process air P in the process air channel 12 is brought about by a fan 15, which is connected in the process air channel 12 here by way of example between the process air condenser 13 and the heater 14.

Present between the laundry drum 11 and the process air condenser 13 is a lint separator 16, for eliminating or separating lint from the process air P. The lint is typically carried along by the process air P passing over the laundry in the laundry drum 11. The lint separator 16 is intended to prevent lint getting onto the process air condenser 13 and coating it in a thermally insulating manner.

The tumble dryer W has a lint wetter 17 connected to the process air channel 12 for flow purposes upstream of the lint separator. The lint wetter 17 serves to introduce water vapor and/or mist particles into the process air channel P upstream of the lint separator 16, to produce conglomerations of water and lint, said conglomerations being retained much more readily by the lint separator 16 than individual (dry) lint. In one variant the lint separator 16 and lint wetter 17 can also be integrated in a common assembly.

The lint wetter 17 can have, for example, a vapor generator and/or a vaporizer (e.g. a piezo electrically operated aerosol generator).

Figure 2:
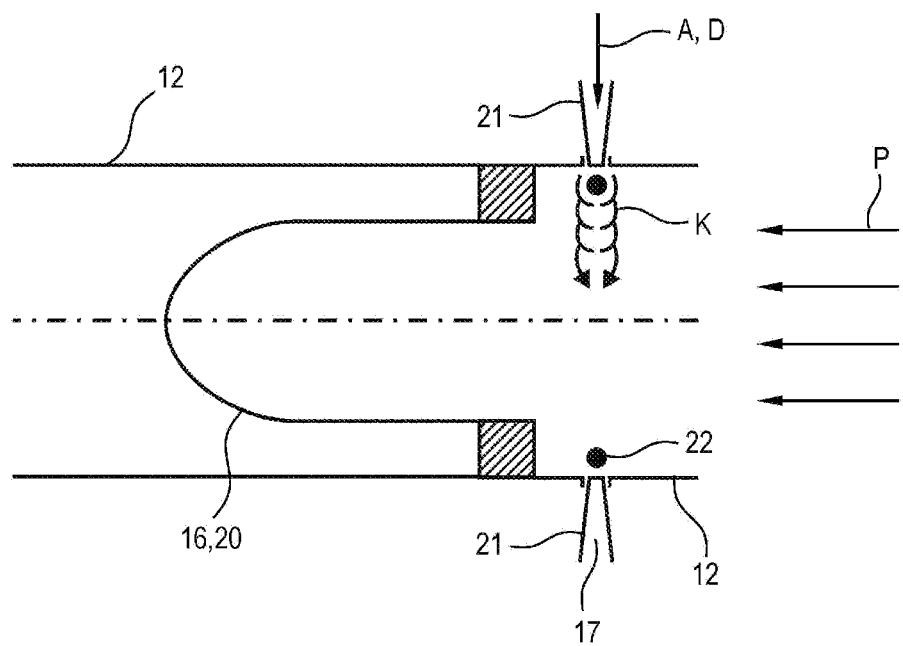
FIG. 2 shows a lint separator according to a first exemplary embodiment.

FIG. 2 shows a side view of a sectional diagram of a possible embodiment of the lint separator 16 according to a first exemplary embodiment. The lint separator 16 here has a filter bag 20 for retaining wet lint. At least two nozzle heads 21 of the lint wetter 17 open into the flow upstream of the filter bag 20 into the process air channel 12, allowing vapor and/or mist particles D to be introduced into the process air channel 12 by means of pressurized air, in order to mix with the process air P containing lint and form the conglomerations.

A body 22 is located in each instance in the flow downstream of the nozzle heads 21 and therefore here in the process air channel 12, around which body 22 the vapor and/or mist particles D can flow. As they flow around, what is known as a Karman eddy current K with opposing vortices forms downstream of the body 22. The vortices improve the mixing of the process air P with vapor and/or mist particles D and therefore conglomeration formation. The fairly long dimensions of the filter bag 20 in the flow direction of the process air P mean that there is a sufficiently long distance to provide for particularly effective mixing.

Figure 3:
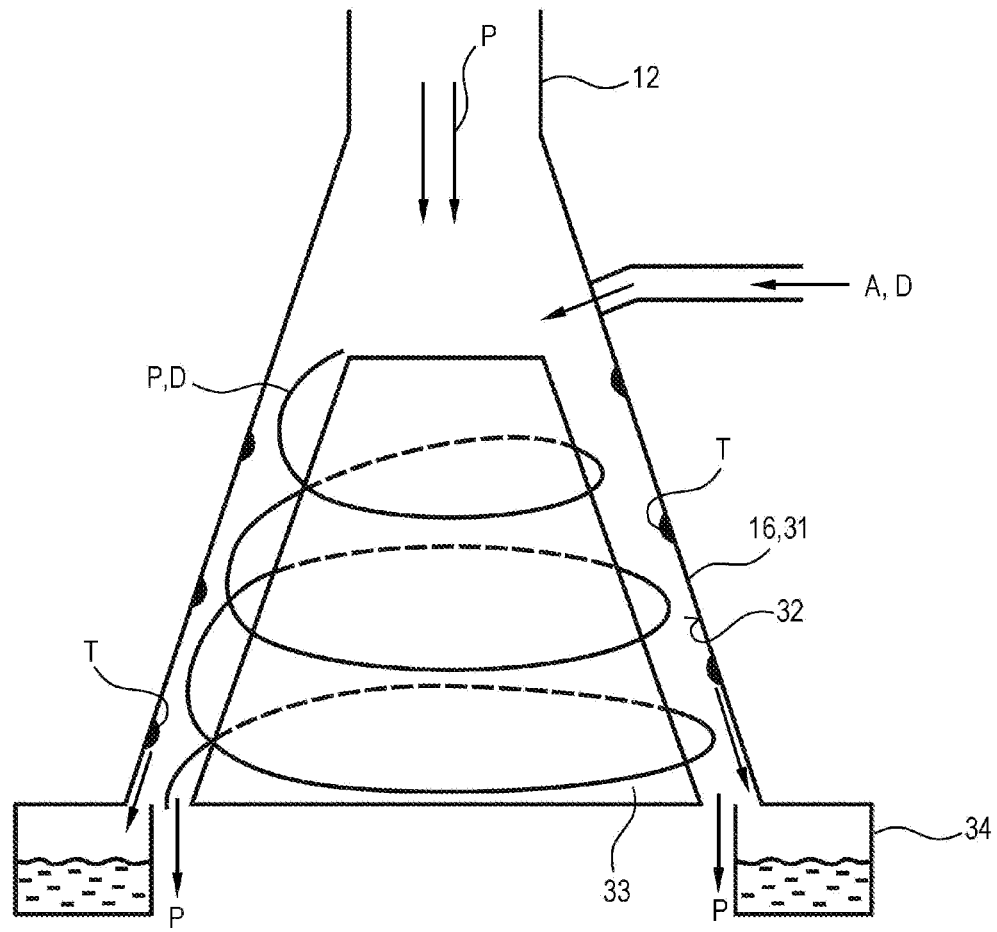
FIG. 3 shows a lint separator according to a second exemplary embodiment.

FIG. 3 shows a side view of a sectional diagram of a further possible lint separator 16 according to a second exemplary embodiment with a cyclone separator 31. This cyclone separator 31 can, for example, have a similar basic structure to a cyclone separator described in U.S. Pat. No. 6,270,558 B1. With the cyclone separator 31 incoming process air P is made to rotate by means of a pressurized air jet A admitted at the side, with the process air P in the cyclone separator 31 travelling on a spiral path that widens in the manner of a truncated cone due to an outer wall 32 in the shape of a truncated cone and a body 33 in the shape of a truncated cone disposed therein. Provision of the body 33 causes a consistently high speed and rotation energy of the process air P to be maintained. The rotational component of the process air P causes heavier particles to be pressed against the wall 32, so that they can be separated spatially from the lighter (pure) process air P.

With the illustrated cyclone separator 31, the vapor and/or mist particles D generated by the lint wetter 17 are introduced with the pressurized air jet A. The conglomerations of greater mass thus formed are effectively thrown against the wall 32 by the rotational movement (centrifugal force) and remain attached there due to the high level of water adhesion, until a sufficient volume of water has accumulated to allow the water to run down with the lint connected thereto, e.g. as water drops T. The water drops T can be collected for example in a trough 34. Lint is largely eliminated from the process air P exiting from the cyclone separator 31. The cyclone separator 31 also serves to dry the process air P further, as moisture carried along by the laundry can also be deposited on the wall and then drip down.

To collect water drops T more easily, the wall 32 can be provided with an easy-slide coating, made for example of PTFE, nanostructures or nanoparticles, for example to produce a lotus effect, at least on its top face that can be wet by the conglomerations.

Naturally the present invention is not limited to the illustrated exemplary embodiments.

It is therefore possible also to dispense with the body 33 for example in a cyclone separator. The cyclone separator can also have a specifically wet wall, to which end a sprinkler system can be used for example. Generally the lint wetter can be supplied by condensate occurring at the process air condenser.

What is claimed is:

1. A lint retention apparatus for a laundry drying appliance having a process air channel that recirculates process air from a drying chamber to a condenser and from the condenser to the dryer chamber, the lint retention apparatus comprising:
    a lint separator located at a position in the process air channel that is between the drying chamber and the condenser, the lint separator including a filter bag; and
    a lint wetter connected upstream of the filter bag such that lint in the process air is wetted by fluid in the form of vapor or mist particles from the lint wetter before the process air enters the filter bag, and the vapor or mist particles and lint combine to form conglomerations upstream of the filter bag that readily adhere to an inner surface of the filter bag;
    wherein all of the process air that reaches the condenser flows through the filter bag.

2. The lint retention apparatus of claim 1, wherein the lint wetter comprises one of a vapor generator and a vaporizer.

3. The lint retention apparatus of claim 2, wherein the lint wetter includes a nozzle through which a fluid is passed into the air channel to wet the lint.

4. The lint retention apparatus of claim 3, further comprising an eddy creating body positioned proximate the nozzle to create eddy currents in the fluid.

5. The lint retention apparatus of claim 4, wherein the nozzle is positioned to direct the eddy current in a direction substantially perpendicularly to a direction in which the process air is conveyed.

6. The lint retention apparatus of claim 4, wherein the eddy creating body is configured such that the eddy currents in the fluid promote mixing of the fluid with the lint in the process air.

7. The lint retention apparatus of claim 2, wherein the lint wetter is configured to direct the vapor or mist particles transverse to the process air channel.

8. The lint retention apparatus of claim 1, wherein the filter bag is configured for retaining the wet lint.

9. The lint retention apparatus of claim 1, wherein the lint wetter is adapted to generate an eddying flow of vapor or mist particles.

10. The lint retention apparatus of claim 1, wherein the lint wetter includes a nozzle through which a fluid is passed into the air channel to wet the lint.

11. The lint retention apparatus of claim 10, further comprising an eddy creating body positioned proximate the nozzle to create eddy currents in the fluid.

12. The lint retention apparatus of claim 11, wherein the eddy creating body is configured such that the eddy currents in the fluid promote mixing of the fluid with the lint in the process air.

13. A laundry drying appliance, comprising:
    a laundry drum;
    a process air condenser;
    the process air channel being adapted to recirculate the process air from the laundry drum to the process air condenser, and from the process air condenser back into the laundry drum;
    a process air channel connecting the laundry drum and the process air condenser for conducting process air;
    a lint separator positioned in the process air channel downstream of the laundry drum and upstream of the process air condenser, the lint separator including a filter bag; and
    a lint wetter positioned downstream of the laundry drum and upstream of the filter bag such that lint in the process air is wetted by the lint wetter using vapor and/or mist particles before the process air enters the filter bag, and the vapor or mist particles and lint combine to form conglomerations upstream of the filter bag that readily adhere to an inner surface of the filter bag;
    wherein all of the process air that reaches the condenser flows through the filter bag.

14. The laundry drying appliance of claim 13, wherein the lint wetter comprises one of a vapor generator and a vaporizer.

15. The laundry drying appliance of claim 14, wherein the lint wetter includes a nozzle through which a fluid is passed into the air channel to wet the lint.

16. The laundry drying appliance of claim 15, further comprising an eddy creating body positioned proximate the nozzle to create eddy currents in the fluid.

17. The laundry drying appliance of claim 16, wherein the eddy creating body is configured such that the eddy currents in the fluid promote mixing of the fluid with the lint in the process air.

18. The laundry drying appliance of claim 13, wherein the filter bag is configured for retaining the wet lint.

19. The laundry drying appliance of claim 13, wherein the lint wetter includes a nozzle through which a fluid is passed into the air channel to wet the lint.

20. The laundry drying appliance of claim 19, further comprising an eddy creating body positioned proximate the nozzle to create eddy currents in the fluid.

21. The laundry drying appliance of claim 20, wherein the eddy creating body is configured such that the eddy currents in the fluid promote mixing of the fluid with the lint in the process air.

* * * * *